United States Patent
You et al.

(10) Patent No.: US 10,717,434 B2
(45) Date of Patent: Jul. 21, 2020

(54) APPARATUS FOR PREVENTING PEDESTRIAN COLLISION ACCIDENT, SYSTEM HAVING THE SAME, AND METHOD THEREOF

(71) Applicant: Hyundai Motor Company, Seoul (KR)

(72) Inventors: Byung Yong You, Gyeonggi-do (KR); Ki Cheol Shin, Gyeonggi-do (KR); Myung Seon Heo, Seoul (KR); Young Chul Oh, Gyeonggi (KR)

(73) Assignee: Hyundai Motor Company, Seoul (KR)

(*) Notice: Subject to any disclaimer, the term of this patent is extended or adjusted under 35 U.S.C. 154(b) by 437 days.

(21) Appl. No.: 15/496,585

(22) Filed: Apr. 25, 2017

(65) Prior Publication Data

US 2018/0162388 A1    Jun. 14, 2018

(30) Foreign Application Priority Data

Dec. 13, 2016   (KR) .......................... 10-2016-0169620

(51) Int. Cl.
*B60W 30/09* (2012.01)
*G08G 1/16* (2006.01)
(Continued)

(52) U.S. Cl.
CPC ............. *B60W 30/09* (2013.01); *B60Q 1/525* (2013.01); *B60Q 9/008* (2013.01); *B60R 1/00* (2013.01); *B60W 30/18109* (2013.01); *B60W 50/14* (2013.01); *G06K 9/00369* (2013.01); *G06K 9/00805* (2013.01); *G08G 1/162* (2013.01); *G08G 1/166* (2013.01); *B60K 2370/21* (2019.05); *B60R 2300/8033* (2013.01);

(Continued)

(58) Field of Classification Search
None
See application file for complete search history.

(56) References Cited

U.S. PATENT DOCUMENTS 6,223,125 B1    4/2001   Hall
6,337,637 B1 *  1/2002   Kubota .................... B60T 7/18
                                                        180/271
(Continued)

FOREIGN PATENT DOCUMENTS

JP    2006-323666 A    11/2006
JP    2009-104230 A    5/2009
KR    10-1553143        9/2015

*Primary Examiner* — Navid Ziaeianmehdizadeh
(74) *Attorney, Agent, or Firm* — Mintz Levin Cohn Ferris Glovsky and Popeo, P.C.; Peter F. Corless

(57) ABSTRACT

An apparatus for preventing a pedestrian collision accident, a system having the same, and a method thereof are provided. The apparatus includes a pedestrian sensing unit that senses a pedestrian moving into a dangerous area and calculates velocity and direction information of the pedestrian. A communication unit transmits the velocity and direction information of the pedestrian to a surrounding vehicle. A time-to-collision (TTC) calculating unit calculates a TTC using velocity and direction information of a subject vehicle and second velocity and direction information of the pedestrian, when the TTC calculating unit receives the second velocity and direction information of the pedestrian from another vehicle. A controller outputs based on the TTC a warning to a driver of the subject vehicle or the pedestrian.

9 Claims, 15 Drawing Sheets

(51) Int. Cl.

| | | |
|---|---|---|
| *B60Q 1/52* | (2006.01) | |
| *G06K 9/00* | (2006.01) | |
| *B60Q 9/00* | (2006.01) | |
| *B60R 1/00* | (2006.01) | |
| *B60W 30/18* | (2012.01) | |
| *B60W 50/14* | (2020.01) | |

(52) U.S. Cl.
CPC ............... *B60R 2300/8093* (2013.01); *B60W 2050/143* (2013.01); *B60W 2050/146* (2013.01); *B60W 2420/42* (2013.01); *B60W 2554/00* (2020.02); *B60W 2710/18* (2013.01)

(56) References Cited

U.S. PATENT DOCUMENTS

| | | | | |
|---|---|---|---|---|
| 8,164,432 | B2* | 4/2012 | Broggi | G01S 17/023 340/425.5 |
| 9,336,436 | B1* | 5/2016 | Dowdall | G08G 1/166 |
| 9,718,405 | B1* | 8/2017 | Englander | G01S 19/13 |
| 10,239,539 | B2* | 3/2019 | Aoki | B60W 40/02 |
| 2005/0201590 | A1* | 9/2005 | Kudo | B60W 30/16 382/103 |
| 2012/0314071 | A1* | 12/2012 | Rosenbaum | B60W 30/0956 348/148 |
| 2013/0060400 | A1* | 3/2013 | Hahne | G08G 1/161 701/1 |
| 2015/0035685 | A1* | 2/2015 | Strickland | B60Q 9/008 340/901 |
| 2015/0120138 | A1* | 4/2015 | Zeng | B62D 15/0265 701/41 |
| 2015/0146919 | A1* | 5/2015 | Ryu | G06K 9/4642 382/103 |
| 2016/0075332 | A1* | 3/2016 | Edo-Ros | B60W 30/0956 701/70 |
| 2016/0121791 | A1* | 5/2016 | Shimizu | G08G 1/166 340/435 |
| 2016/0193999 | A1* | 7/2016 | Sasabuchi | B60T 7/22 701/301 |
| 2017/0018187 | A1* | 1/2017 | Kim | G08G 1/166 |
| 2018/0204462 | A1* | 7/2018 | Tomescu | B60T 7/22 |
| 2018/0326982 | A1* | 11/2018 | Paris | B60W 30/0956 |

* cited by examiner

APPARATUS FOR PREVENTING PEDESTRIAN COLLISION ACCIDENT, SYSTEM HAVING THE SAME, AND METHOD THEREOF

CROSS-REFERENCE TO RELATED APPLICATION

This application is based on and claims the benefit of priority to Korean Patent Application No. 10-2016-0169620, filed on Dec. 13, 2016, in the Korean Intellectual Property Office, the disclosure of which is incorporated herein in its entirety by reference.

TECHNICAL FIELD

The present disclosure relates to an apparatus for preventing a pedestrian collision accident, a system having the same, and a method thereof, and more particularly, to a technology capable of preventing a pedestrian, which is hidden by parked and stopped vehicles, from colliding with a traveling vehicle.

BACKGROUND

According to traffic accident records of the National Police Agency, fatalities of pedestrian accidents occupy more than 40% of the total traffic accident fatalities. The most common cause of pedestrian accidents is pedestrian jaywalking. In particular, a pedestrian accident often occurs when vehicles 10 illegally park or stop in line with each other along a road as illustrated in FIG. 1, or when a traveling vehicle 30 collides with a pedestrian 20 while the pedestrian 20 is hidden or blocked by the vehicles 10 parked or stopped illegally and then suddenly stepping out in front of the vehicles 10 as illustrated in FIG. 2.

In this regard, conventionally, techniques have been developed to prevent a pedestrian accident by sensing a suddenly appearing pedestrian using a technology of sensing a pedestrian. However, the conventional technology of sensing a pedestrian merely recognizes the suddenly appearing pedestrian, but is not capable of sensing the movement of the pedestrian in advance and predicting and preventing the collision between the pedestrian and a traveling vehicle in advance.

SUMMARY

The present disclosure provides an apparatus for preventing a pedestrian collision accident, a system having the same, and a method thereof, capable of sensing a pedestrian in advance, which is hidden by (e.g., not readily visible) drivers in parked or stopped vehicles, such that the collision between the pedestrian and a traveling vehicle may be predicted in advance and the pedestrian and the traveling vehicle may be warned, thereby preventing a pedestrian collision accident in advance.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for preventing a pedestrian collision accident may include a pedestrian sensing unit configured to sense a pedestrian moving into a dangerous area and calculate velocity and direction information of the pedestrian, a communication unit configured to transmit the velocity and direction information of the pedestrian to a surrounding vehicle, a time-to-collision (TTC) calculating unit configured to calculate a time to collision (TTC) using velocity and direction information of a subject vehicle (e.g., a traveling vehicle) and second velocity and direction information of the pedestrian, when the time-to-collision calculating unit receives the second velocity and direction information of the pedestrian from another vehicle, a controller configured to operate a warning unit to output, based on the time to collision (TTC), a warning notification to a driver regarding the subject vehicle or the pedestrian.

According to an exemplary embodiment, the pedestrian sensing unit may be configured to sense the pedestrian based on image data and sensing data on a periphery of the subject vehicle. The apparatus may further include a dangerous area defining unit configured to distinguish between a road and a sidewalk based on the image data and the sensing data on the periphery of the subject vehicle and define the road as the dangerous area. The pedestrian sensing unit may further be configured to sense whether the pedestrian moves along the sidewalk or moves into the dangerous area.

Additionally, the time-to-collision calculating unit may be configured to calculate a moving direction and a velocity vector of the pedestrian based on the second velocity and direction information of the pedestrian, calculate a moving direction and a velocity vector of the subject vehicle, calculate an interconnecting point between the velocity vector of the pedestrian and the velocity vector of the subject vehicle, and calculate a time, in which the subject vehicle arrives at the interconnecting point, as the time to collision (TTC). The controller may be configured to operate a brake device of the subject vehicle to forcibly decelerate or stop the subject vehicle and request a parking or stopping vehicle to warn the pedestrian, when the time to collision (TTC) is less than a first threshold value.

According to an exemplary embodiment, the controller may be configured to provide a warning or notification to the driver of the subject vehicle such that the driver drives the subject vehicle at a reduced speed, and request the parking or stopping vehicle to warn the pedestrian, when the time to collision (TTC) is equal to or greater than the first threshold value and is less than a second threshold value. The controller may further be configured to request the parking or stopping vehicle to warn the pedestrian, when the time to collision (TTC) is equal to or greater than the second threshold value and is less than a third threshold value.

Additionally, the controller may be configured to determine a present situation as being an emergency situation to request the parking or stopping vehicle to warn the pedestrian by simultaneously operating a horn and an emergency lamp, when the time to collision (TTC) is less than the first threshold value, and may be configured to request the parking or stopping vehicle to warn the pedestrian by operating one of the horn and the emergency lamp, when the time to collision (TTC) is equal to or greater than the first threshold value and is less than a third threshold value.

According to another aspect of the present disclosure, a method of preventing a pedestrian collision accident may include sensing a pedestrian moving into a dangerous area, calculating velocity and direction information of the pedestrian, transmitting the velocity and direction information of the pedestrian to surrounding vehicles, and warning the pedestrian when a command for warning the pedestrian is received from a traveling vehicle among the surrounding vehicles. According to an exemplary embodiment, the sensing of the pedestrian may include sensing the pedestrian based on image data and sensing data on a periphery of a subject vehicle. The calculating of the velocity and direction information of the pedestrian may include distinguishing between a road and a sidewalk based on the image data and the sensing data on the periphery of the subject vehicle, defining the road as a dangerous area, and calculating a velocity of the pedestrian moving into the dangerous area. In the warning of the pedestrian, a horn or an emergency lamp may be used.

According to another aspect of the present disclosure, a method of preventing a pedestrian collision accident may include receiving velocity and direction information of a pedestrian from a vehicle parked or stopped along a street, calculating a time to collision (TTC) using velocity and direction information of a subject vehicle, which is traveling, and the velocity and direction information of the pedestrian, and transmitting a command for warning the pedestrian to the vehicle parked or stopped along the street or warning a driver of the subject vehicle, based on the time to collision (TTC).

According to an exemplary embodiment, the method may further include operating the subject vehicle to automatically decelerate or stop. In particular, a brake device of the subject vehicle may be operated to forcibly decelerate or stop the subject vehicle, when the time to collision (TTC) is less than a first threshold value. In the transmitting of the command for warning the pedestrian to the vehicle parked or stopped along the street or the warning of the driver of the subject vehicle, based on the time to collision (TTC), the driver of the subject vehicle may be warned such that the driver drives the subject vehicle at a reduced speed, when the time to collision (TTC) is equal to or greater than the first threshold value and is less than a second threshold value. Additionally, in the transmitting of the command for warning the pedestrian to the vehicle parked or stopped along the street or the warning of the driver of the subject vehicle, based on the time to collision (TTC), the parked or stopped vehicle may be requested to warn the pedestrian, when the time to collision (TTC) is equal to or greater than the second threshold value and is less than a third threshold value.

The command for warning the pedestrian by simultaneously operating a horn and an emergency lamp may be transmitted when the time to collision (TTC) is less than the first threshold value, and the command for warning the pedestrian by operating the horn or the emergency lamp may be transmitted when the time to collision (TTC) is equal to or greater than the first threshold value and is less than the third threshold value, when the command for warning the pedestrian is transmitted to the vehicle parked or stopped along the street. The calculating of the time to collision (TTC) may include calculating a moving direction and a velocity vector of the pedestrian, calculating a moving direction and a velocity vector of the subject vehicle, calculating an interconnecting point between the velocity vector of the pedestrian and the velocity vector of the subject vehicle, and calculating a time, in which the subject vehicle arrives at the interconnecting point, as the time to collision (TTC).

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
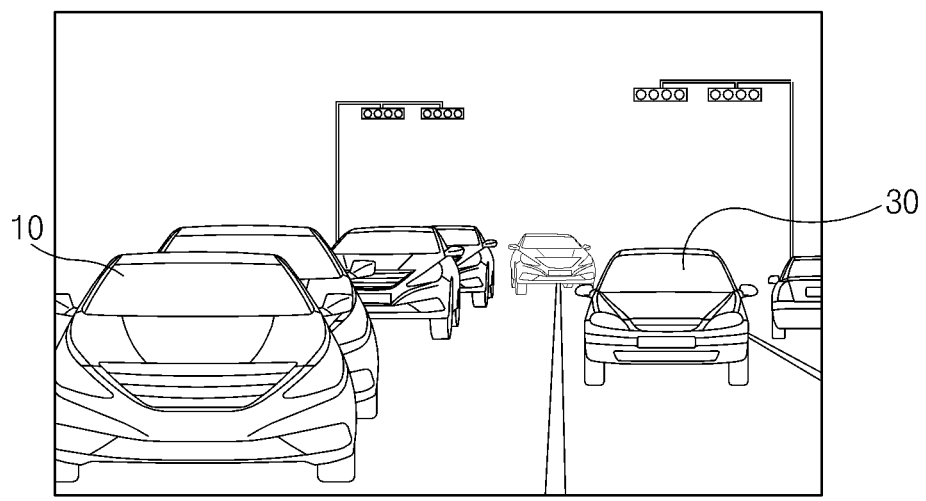
FIG. 1 is a view illustrating vehicles illegally parked or stopped along a street according to the related art.
Figure 2:
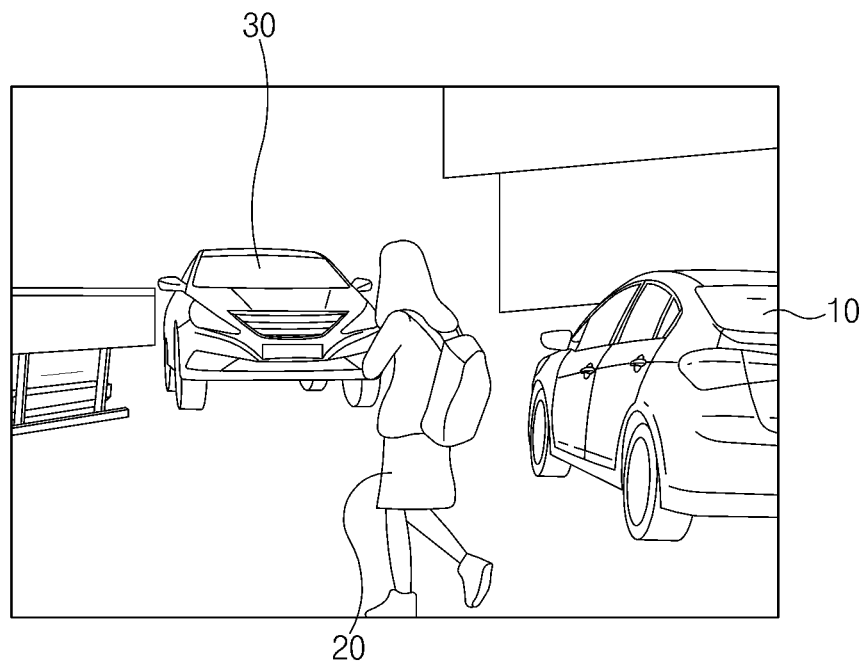
FIG. 2 is a view illustrating the movement of a pedestrian and a traveling vehicle between the vehicles illegally parked or stopped along the street according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/controller refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. In the drawings, the same reference numerals will be assigned to the same elements even though the elements are shown in different drawings. In addition, in the following description, a detailed description of well-known features or functions will be ruled out in order not to unnecessarily obscure the gist of the present disclosure.

In the following description of elements according to an exemplary embodiment of the present disclosure, the terms 'first', 'second', 'A', 'B', '(a)', and '(b)' may be used. The terms are used only to distinguish relevant elements from other elements, and the nature, the order, or the sequence of the relevant elements is not limited to the terms. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 3:
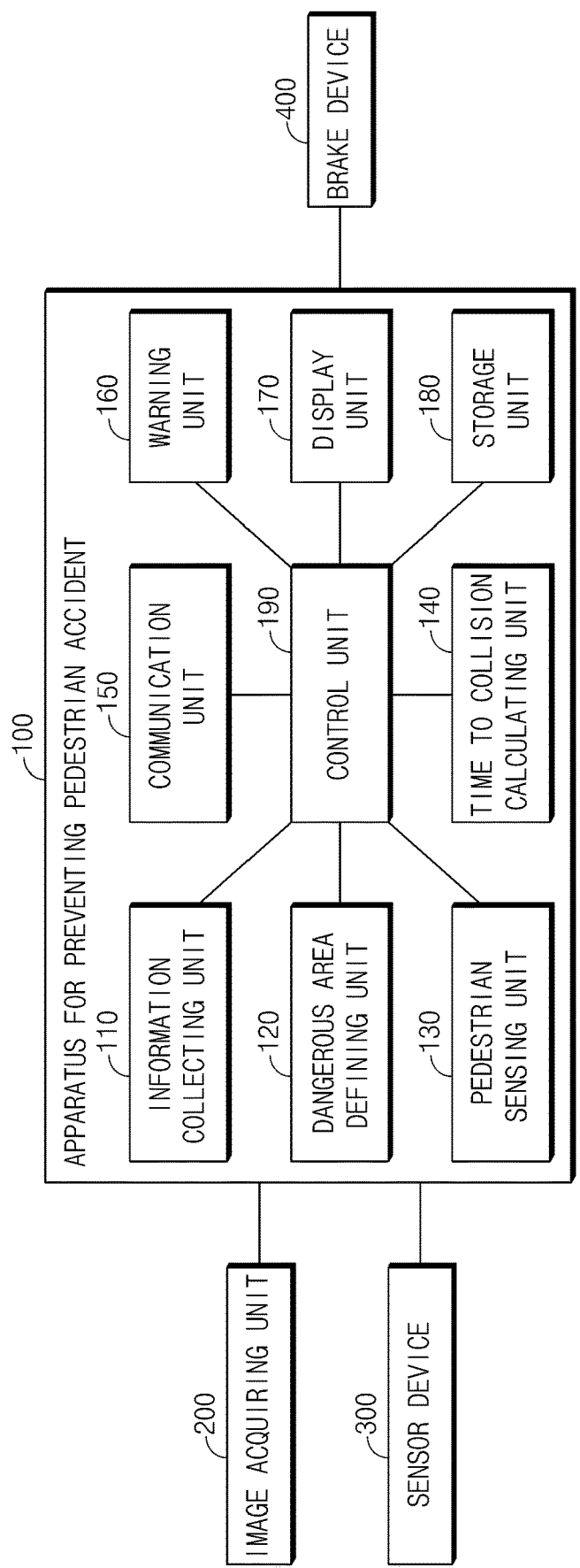
FIG. 3 is a block diagram illustrating a system for preventing a pedestrian collision accident, according to an exemplary embodiment of the present disclosure.

Hereinafter, exemplary embodiments of the present disclosure will be described in detail with reference to FIGS. 3 to 11. FIG. 3 is a block diagram illustrating a system for preventing a pedestrian collision accident, according to an exemplary embodiment of the present disclosure. According to an exemplary embodiment of the present disclosure, the system for presenting the pedestrian collision accident may include an apparatus 100 for preventing the pedestrian collision accident (hereinafter, referred to as "anti-pedestrian collision apparatus"), an image acquiring unit 200, a sensor device 300, and a brake device 400. The components of the apparatus 100 may be operated by an overall controller of the vehicle.

Figure 4:
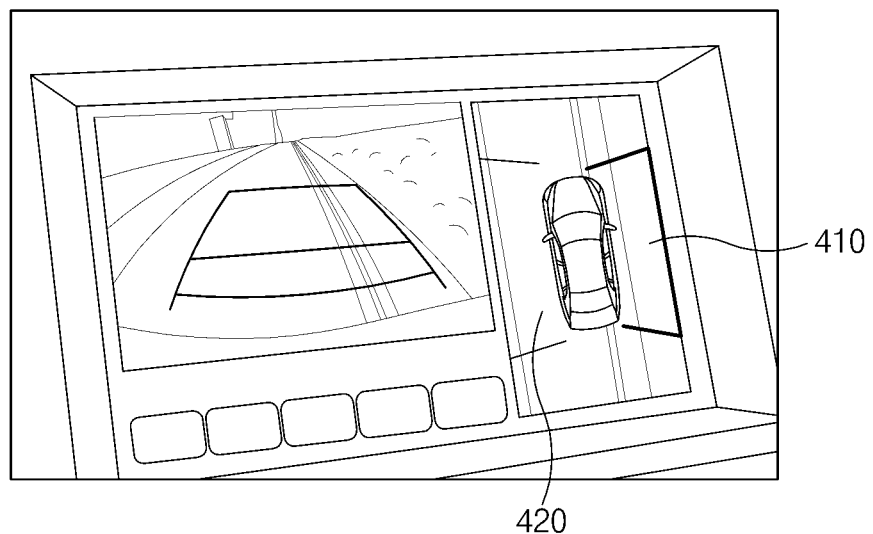
FIG. 4 is a view illustrating image data, according to an exemplary embodiment of the present disclosure.

Particularly, the image acquiring unit 200 may be configured to photograph (e.g., capture an image of) a periphery of a vehicle and transmit image data regarding the periphery or surrounding environment to the anti-pedestrian collision apparatus 100. As illustrated in FIG. 4, based on the image data, an image of a front portion of a vehicle and a detailed image of the vehicle may be displayed together, and a sidewalk 410 and a road 420 may be distinguished therebetween and displayed on a screen within the vehicle. The image acquiring unit 200 may be configured to use an imaging device or camera of an around view monitor (AVM) device to capture the image. The sensor device 300 may be configured to sense or detect obstacles (e.g., pedestrian, vehicle, and the like) around the vehicle and transmit the sensing result to the anti-pedestrian collision apparatus 100. In particular, the sensor device 300 may include an ultrasonic sensor or a lidar sensor. Although not illustrated in the present disclosure, the sensor device 300 may include a wheel sensor or a global positioning system (GPS) sensor to calculate the velocity of a subject vehicle. The brake device 400 may be configured to decelerate or top the vehicle under the control of the anti-pedestrian collision apparatus 100.

Further, the anti-pedestrian collision apparatus 100 may be mounted in a parked or stopped vehicle or a traveling vehicle. When the anti-pedestrian collision apparatus 100 is mounted in the parked or stopped vehicle, the anti-pedestrian collision apparatus 100 may be configured to calculate a moving direction and a velocity of the pedestrian based on image data and sensing data, transmit information regarding the moving direction and velocity of the pedestrian to a surrounding vehicle, and warn the pedestrian by operating a horn or an emergency lamp when the anti-pedestrian collision apparatus 100 receives a request for the warning to the pedestrian from the surrounding vehicle. Meanwhile, when the anti-pedestrian collision apparatus 100 is mounted in the traveling vehicle, the anti-pedestrian collision apparatus 100 may be configured to calculate a time to collision (TTC) using the information regarding the moving direction and velocity of the pedestrian received from the parked or stopped vehicle and the velocity and direction information of a subject vehicle, forcibly brake the subject vehicle based on the TTC, warn a driver of the subject vehicle such that the driver drives the subject vehicle at a reduced speed, and request the vehicle, which transmits the information on the moving direction and velocity of the pedestrian, to warn the pedestrian.

Accordingly, the anti-pedestrian collision apparatus 100 may include an information collecting unit 110, a dangerous area defining unit 120, a pedestrian sensing unit 130, a time-to-collision calculating unit 140, a communication unit 150, a warning unit 160, a display unit 170, a storage unit 180, and a controller 190. The information collecting unit 110 may be configured to collect the image data from the image acquiring unit 200 and collect the sensing data from the sensor device 300. The dangerous area defining unit 120 may be configured to distinguish between the road 420 and the sidewalk 410 in the image data of FIG. 4 and define the road 420 as a dangerous area (e.g., an area in which pedestrian collision is possible). In particular, FIG. 4 is a view illustrating the image data, according to an exemplary embodiment of the present disclosure, that is, a view illustrating an AVM screen.

Figure 5A:
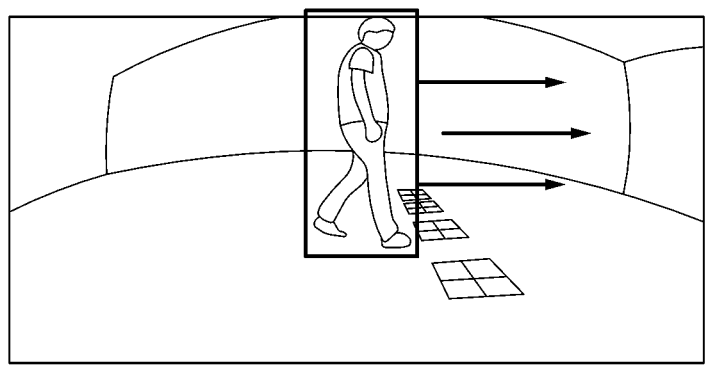
FIG. 5A is a view illustrating a pedestrian moving in a transverse direction, according to an exemplary embodiment of the present disclosure.
Figure 5B:
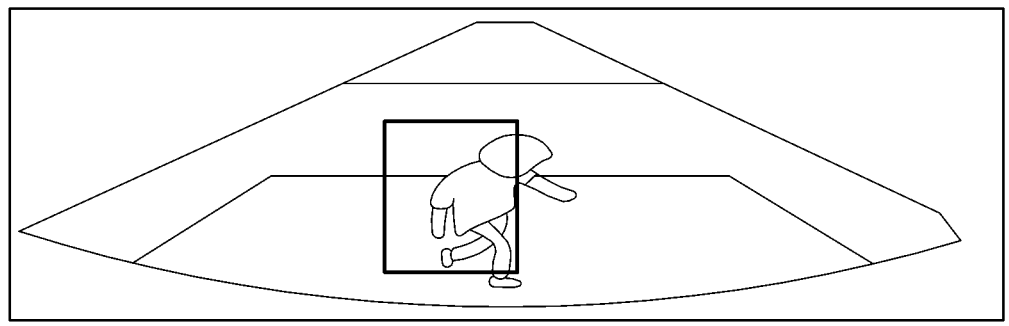
FIGS. 5B-5E are views illustrating images of a sensed pedestrian which is displayed on an around view monitor (AVM) screen, according to an exemplary embodiment of the present disclosure.
Figure 5C:
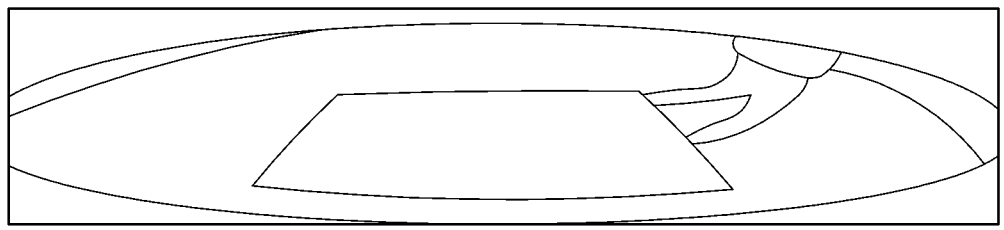
Figure 5D:
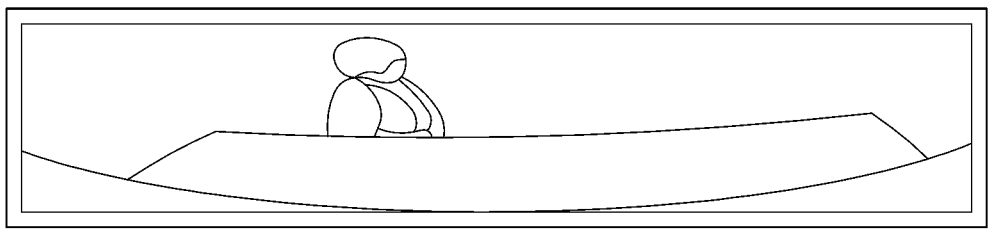
Figure 5E:
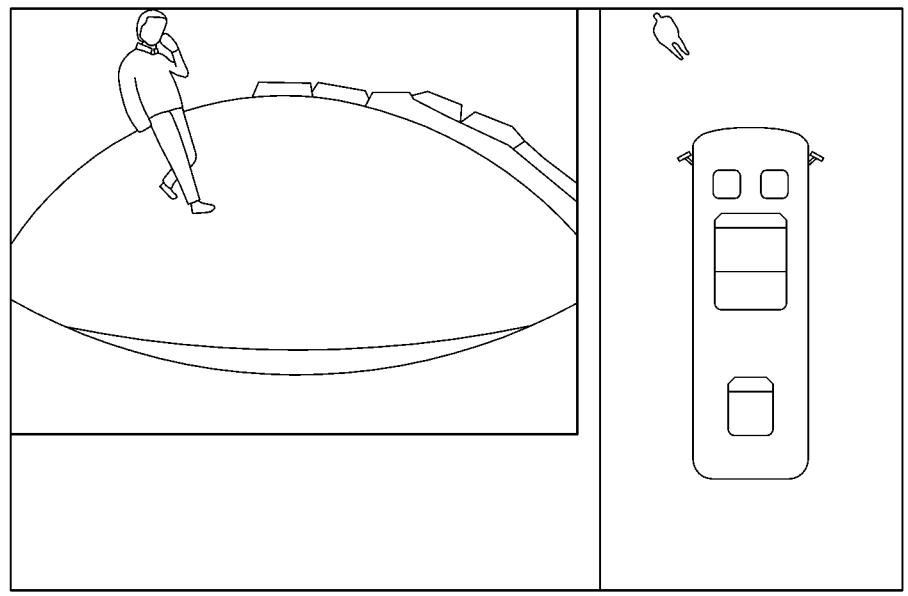

The pedestrian sensing unit 130 may be configured to sense or detect a pedestrian moving along the sidewalk or moving into the dangerous area and calculate the velocity and direction information of the pedestrian. Particularly, the pedestrian sensing unit 130 may be configured to sense the pedestrian based on the image data and the sensing data of a periphery or surrounding environment of the subject vehicle as illustrated in FIGS. 5A-5E. In other words, the pedestrian sensing unit 130 may be configured to sense whether the pedestrian moves along the sidewalk, is stopped, or moves into the dangerous area. FIG. 5A is a view illustrating that the pedestrian moves rightward, and it may be recognized from FIG. 5A that the pedestrian moves in a transverse direction or a longitudinal direction. The sensing of the pedestrian may be performed by detecting motion candidates from the image data and estimating the positions of the motion candidates. In particular, a vector based on an optical flow is analyzed to detect the motion candidates and to estimate the positions of the motion candidates. In addition, the motion of the candidates is analyzed according to heights of the camera and features of a fixed object are extracted, thereby sensing the pedestrian.

The time-to-collision calculating unit 140 may be configured to calculate a TTC using the velocity and direction information of the subject vehicle and received velocity and direction information of the pedestrian, when the subject vehicle receives the velocity and direction information of the pedestrian from another vehicle. In other words, the time-to-collision calculating unit 140 may be configured to calculate a moving direction and a velocity vector of the pedestrian based on the velocity and direction information of the pedestrian, calculate a moving direction and a velocity vector of the subject vehicle, and calculate the interconnecting point between the velocity vector of the pedestrian and the velocity vector of the subject vehicle.

Figure 6:
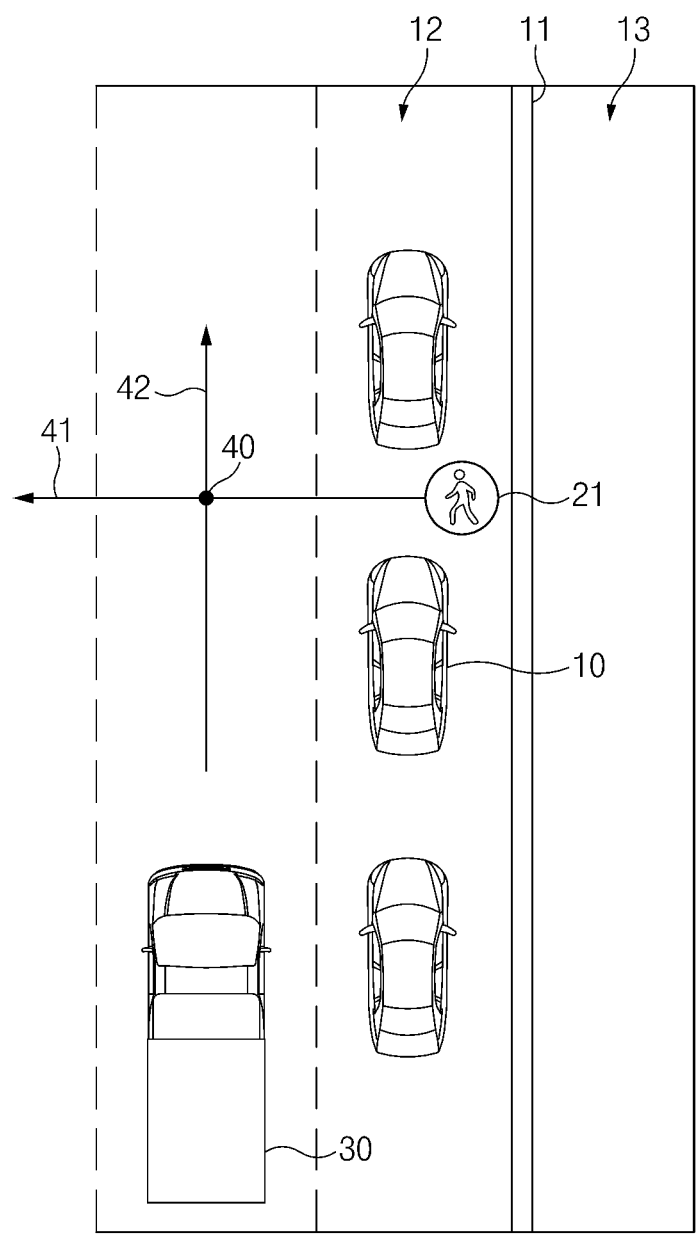
FIG. 6 is a view illustrating a method of calculating a time to collision of a pedestrian moving into a dangerous area, according to an exemplary embodiment of the present disclosure.

FIG. 6 is a view illustrating a method of calculating the TTC of the pedestrian moving into the dangerous area, according to an exemplary embodiment of the present disclosure. Referring to FIG. 6, a road 12 and a sidewalk 13 are divided from each other by a curb 11, and a pedestrian 21 moves into a dangerous area while a vehicle (subject vehicle or traveling vehicle) 30 is traveling. In particular, the time-to-collision calculating unit 140 of the traveling vehicle 30 may be configured to determine an interconnecting point 40 between a velocity vector 41 of the pedestrian 21 and a velocity vector 42 of the traveling vehicle 30 as a collision point between the pedestrian 21 and the vehicle 30. Accordingly, a time point in which the traveling vehicle 30 arrives at or reaches the interconnecting point 40 may be determined as the TTC.

In addition, the time-to-collision calculating unit 140 may be configured to calculate a relative longitudinal-direction distance using GPS information, and calculate a relative transverse-direction distance using information regarding a lane of the vehicle 30 (e.g., a lane in which the subject vehicle 30 is traveling). For example, based on the assumption that the vehicle 30 is traveling in a second road lane among three lanes, and a lane width may be about 3.5 m, when the parked or stopped vehicle is present along the third lane, the relative transverse-direction distance may be about 5.25 m since 3.5+3.5/2=5.25 m.

Figure 8:
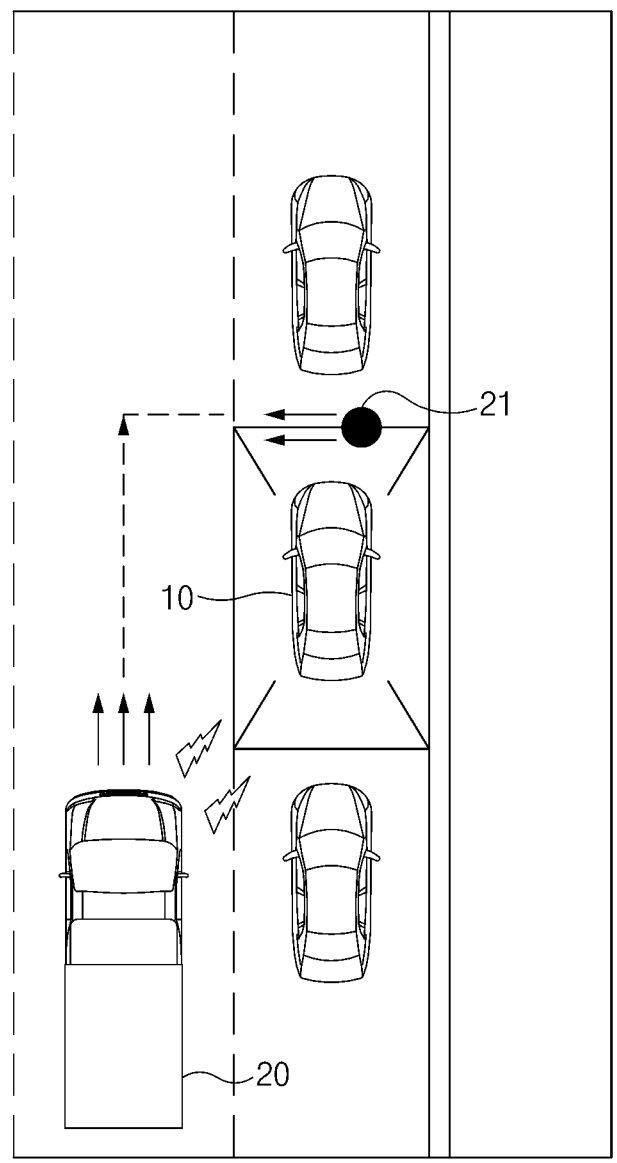
FIG. 8 is a view illustrating a method of preventing a collision accident of a pedestrian moving into a dangerous area, according to an exemplary embodiment of the present disclosure.
Figure 9:
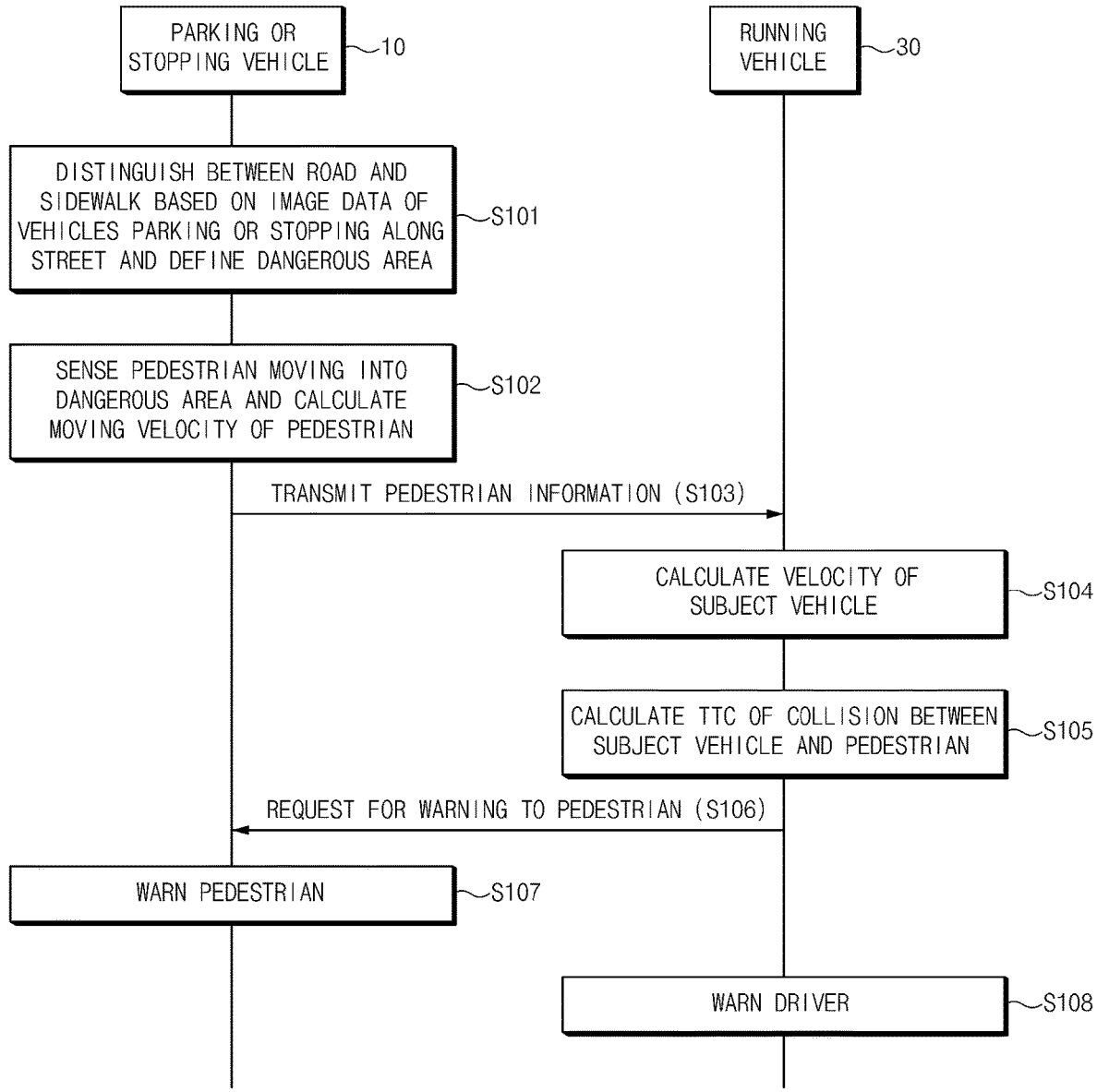
FIG. 9 is a flowchart illustrating a method of preventing a pedestrian collision accident, according to an exemplary embodiment of the present disclosure.

As illustrated in FIG. 8, the communication unit 150 may be configured to communicate with a surrounding vehicle. In particular, the communication unit 150 may be configured to transmit the velocity and direction information of the pedestrian to the surrounding vehicle, or transmit a command for warning the pedestrian to the surrounding vehicle. The warning unit 160 may be operated by the controller 190 to warn a driver of the subject vehicle or the pedestrian. In particular, the warning unit 160 may be configured to warn the driver of the subject vehicle such that the driver drives the subject vehicle at a reduced speed, or may be configured to output a warning sound or a warning sentence (e.g., a verbal message through a speaker or a visual message output on a screen).

The display unit 170 may be configured to display the image data, the warning sentence, and the like. The storage unit 180 may be configured to store the image data, the sensing data, the warning sentence, the information (e.g., moving direction, velocity, and the like) of the pedestrian, and the TTC. The controller 190 may be configured to output a warning to the driver of the subject vehicle or the pedestrian based on the TTC. In other words, when the TTC is less than a first threshold value, the controller 190 may be configured to operate the brake device 400 of the subject vehicle to forcibly decelerate or stop the subject vehicle, and request the surrounding parked or stopped vehicle to warn the pedestrian. In particular, the forcibly decelerating or stopping of the subject vehicle may be performed using an autonomous emergency braking (AEB) system. When the driver does not manipulate or engage a brake pedal after the warning to the driver, an automatic braking operation may be performed.

In addition, the controller 190 may be configured to warn the driver of the subject vehicle such that the driver drives the subject vehicle at a reduced speed, and may be configured to request the parked or stopped vehicle (e.g., the surrounding vehicle) to warn the pedestrian, when the TTC is equal to or greater than the first threshold value and is less than a second threshold value. The controller 190 may be configured to request the parked or stopped vehicle to warn the pedestrian, when the TTC is equal to or greater than the second threshold value and is less than a third threshold value.

Figure 7:
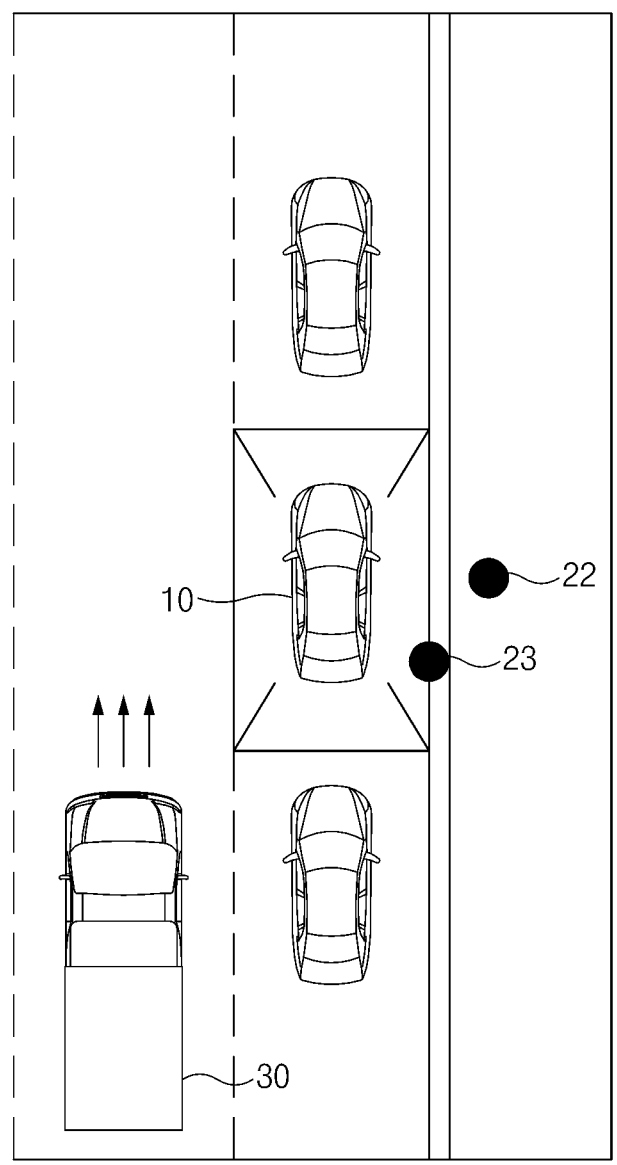
FIG. 7 is a view illustrating a method of preventing a collision accident of a pedestrian stopping, according to an exemplary embodiment of the present disclosure.

Particularly, as the TTC decreases, collision risk increases and as the TTC increases, the collision risk decreases. When the TTC is equal to or greater than the third threshold value, the pedestrian may be stopped (see reference number 23) or may move along the sidewalk (see reference number 22) as illustrated in FIG. 7. In addition, the controller 190 may be configured to determine a present situation as being an emergency situation to request the parked or stopped vehicle to warn the pedestrian by simultaneously operating a horn and an emergency lamp when the TTC is less than the first threshold value. The controller 190 may be configured to request the parked or stopped vehicle to warn the pedestrian by operating one of the horn and the emergency lamp when the TTC is equal to or greater than the first threshold value and is less than the second threshold value, and when the TTC is equal to or greater than the second threshold value and is less than the third threshold value. The first threshold value may be set by adding a certain margin to the time required to reach the point where the pedestrian 21 and the vehicle 30 can stop before reaching the collision point when the brake control is operated and decelerated in the moving vehicle 30. The second threshold value and the third threshold value may set to a value greater than the first threshold value, depending on how soon the system warns collision.

As described above, according to the present disclosure, the pedestrian may be recognized and the TTC may be calculated through the communication between the parked or stopped vehicle (e.g., surrounding vehicle) and the traveling vehicle. Accordingly, the pedestrian or the driver may be warned, and the vehicle may be forcibly decelerated or stopped based on the TTC, thereby preventing the pedestrian accident. Hereinafter, a method of preventing the pedestrian collision accident according to an exemplary embodiment of the present disclosure will be described with reference to FIG. 9. The method described herein below may be executed by the controller having a memory and a processor.

An anti-pedestrian collision apparatus of a parked or stopped vehicle 10 may be configured to distinguish between a road and a sidewalk based on image data of vehicles parked or stopped along a street and define a dangerous area (S101). Thereafter, the anti-pedestrian collision apparatus of the parked or stopped vehicle 10 may be configured to sense a pedestrian moving into the dangerous area and calculate a moving velocity of the pedestrian (S102). Then, the anti-pedestrian collision apparatus of the parked or stopped vehicle 10 may be configured to transmit pedestrian information including a moving direction and a moving velocity of the pedestrian (S103).

Accordingly, an anti-pedestrian collision apparatus of a traveling vehicle 30, which is traveling in the proximity of the parked or stopped vehicle 10, receives the pedestrian information and calculates the velocity of a subject vehicle (S104). Thereafter, the anti-pedestrian collision apparatus of the traveling vehicle 30 may be configured to calculate a TTC of the collision between the subject vehicle and the pedestrian (S105). When the TTC is less than a preset reference value, the anti-pedestrian collision apparatus of the traveling vehicle 30 may be configured to request the anti-pedestrian collision apparatus of the parked or stopped vehicle 10 to warn the pedestrian (S106).

In particular, the anti-pedestrian collision apparatus of the parked or stopped vehicle 10 may be configured to warn the pedestrian by operating a horn or an emergency lamp (S107). In addition, when the TTC is less than the preset reference value, the anti-pedestrian collision apparatus of the traveling vehicle 30 may be configured to warn the driver such that the driver is requested to drive the subject vehicle at a reduced speed, or transmit a command for forcibly decelerating or stopping the subject vehicle to the brake device 400 (S108).

Figure 10:
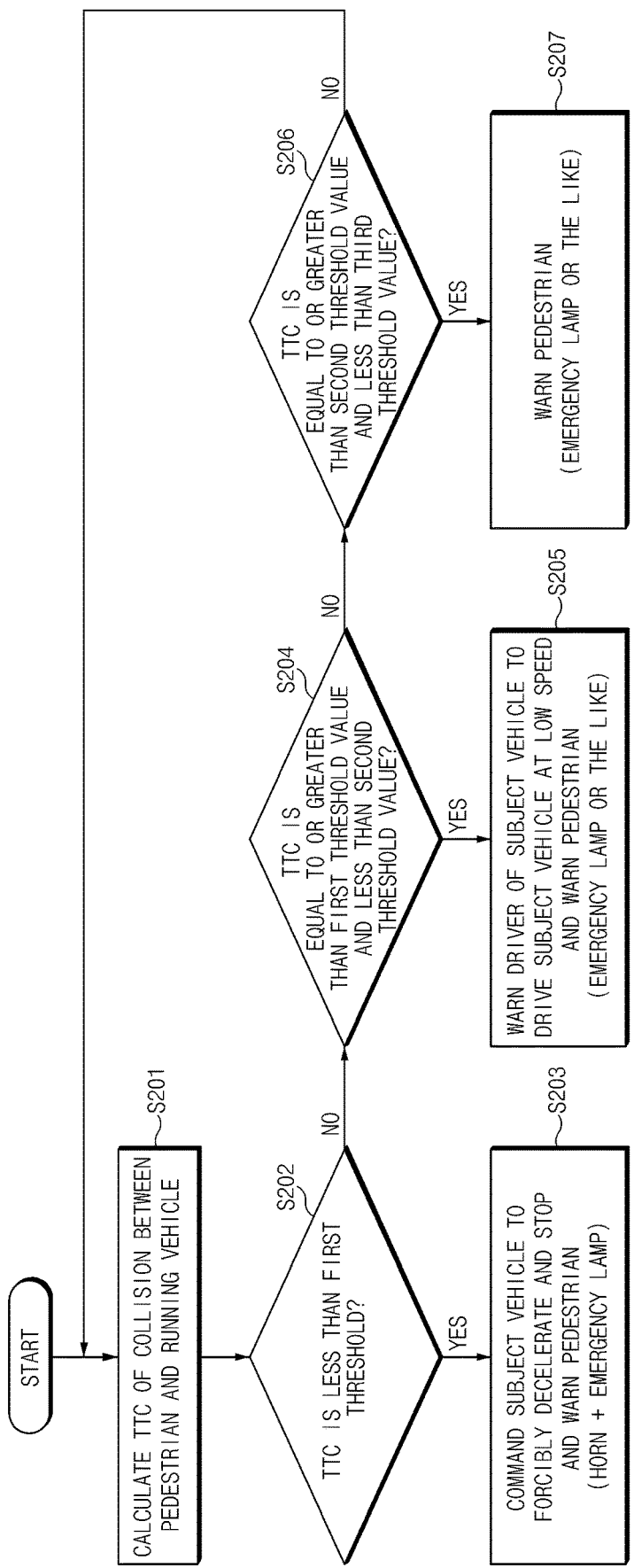
FIG. 10 is a flowchart illustrating a warning method based on a time to collision, according to an exemplary embodiment of the present disclosure.

FIG. 10 is a flowchart illustrating a warning method based on the TTC, according to an exemplary embodiment of the present disclosure. After the TTC of the collision between the pedestrian and the traveling vehicle 30 is calculated (S201), the anti-pedestrian collision apparatus of the traveling vehicle 30 may be configured to determine whether the TTC is less than the first threshold (S202). When the TTC is determined as being less than the first threshold value, the anti-pedestrian collision apparatus of the traveling vehicle 30 may be configured to transmit a command for forcibly decelerating or stopping the subject vehicle to the brake device and request the parked or stopped vehicle 10 to warn the pedestrian by simultaneously operating the horn and the emergency lamp (S203).

Meanwhile, when the TTC is not less than the first threshold value (e.g., is greater than the first threshold value), the anti-pedestrian collision apparatus of the traveling vehicle 30 may be configured to determine whether the TTC is equal to or greater than the first threshold value and is less than a second threshold value (S204). When the TTC is determined to be equal to or greater than the first threshold value and is less than the second threshold value, the anti-pedestrian collision apparatus of the traveling vehicle 30 may be configured to warn the driver of the traveling vehicle 30 by outputting a warning sound or a warning sentence such that the driver drives the subject vehicle at a reduced speed. In addition, the anti-pedestrian collision apparatus of the traveling vehicle 30 may be configured to request the parked or stopped vehicle 10 to warn the pedestrian by operating one of the horn and the emergency lamp (S205).

When the TTC is neither equal to nor greater than the first threshold value and is not less than the second threshold value (e.g., is less than the first threshold value and is equal to or greater than the second threshold value), the anti-pedestrian collision apparatus of the traveling vehicle 30 may be configured to determine whether the TTC is equal to or greater than the second threshold value and is less than a third threshold value (S206). When the TTC is equal to or greater than the second threshold value and is less than the third threshold value, the anti-pedestrian collision apparatus of the traveling vehicle 30 may be configured to request the subject vehicle to warn the pedestrian by operating the horn or the emergency lamp (S207).

As described above, according to the present disclosure, the pedestrian may be recognized and the TTC may be calculated through the communication between the parked or stopped vehicle and the traveling vehicle. Accordingly, the pedestrian or the driver may be warned, and the vehicle may be forcibly decelerated or stopped based on the TTC, thereby preventing the pedestrian accident.

Figure 11:
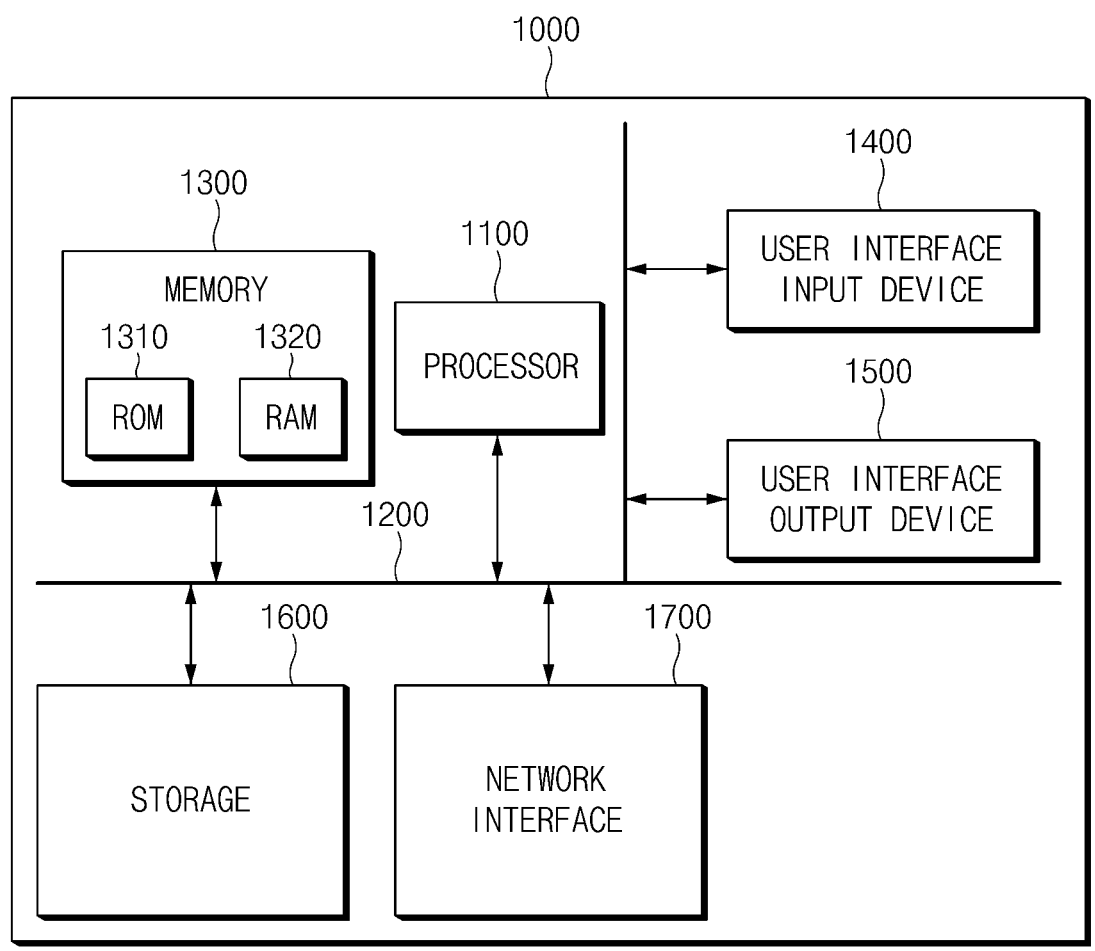
FIG. 11 is a block diagram illustrating a computer system, to which the method of preventing the pedestrian collision accident is applied, according to an exemplary embodiment of the present disclosure.

FIG. 11 is a block diagram illustrating a computer system, to which the method of preventing the pedestrian collision accident is applied, according to an exemplary embodiment of the present disclosure. Referring to FIG. 11, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device which processes instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the exemplary embodiments disclosed in the specification may be directly implemented with a hardware module, a software module, or combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the integrated processor and storage medium may reside as a separate component of the user terminal.

According to exemplary embodiments of the present disclosure, a pedestrian, which is blocked (e.g., not visible or hidden) by parked or stopped vehicles, may be sensed in advance such that the collision between the pedestrian and a traveling vehicle may be predicted and the pedestrian and the traveling vehicle may be warned, thereby preventing the pedestrian collision accident in advance.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims Therefore, exemplary embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

What is claimed is:

1. An apparatus for preventing a pedestrian collision accident, comprising:
a processor; and
a non-transitory storage medium containing program instructions that, when executed by the processor cause the apparatus to:
sense, by a subject vehicle, a pedestrian moving into a dangerous area and calculate velocity and direction information of the pedestrian;
transmit, by the subject vehicle, the velocity and direction information of the pedestrian to surrounding vehicles and receive a warning request from a driving vehicle among the surrounding vehicles;
warn, by the subject vehicle, the pedestrian when the warning request is received from the driving vehicle;
calculate, by the subject vehicle, a time to collision (TTC) by using velocity and direction information of the driving vehicle and the velocity and direction information of the pedestrian received from the driving vehicle among the surrounding vehicles; and
output a warning, by the driving vehicle, based on the time to collision (TTC) to warn a driver of the subject vehicle.

2. The apparatus of claim 1, wherein the program instructions, when executed by the processor further cause the apparatus to sense the pedestrian based on image data and sensing data on a periphery of the subject vehicle.

3. The apparatus of claim 1, wherein the program instructions, when executed by the processor further cause the apparatus to:
distinguish between a road and a sidewalk based on the image data and the sensing data on the periphery of the subject vehicle and to define the road as the dangerous area.

4. The apparatus of claim 3, wherein the program instructions, when executed by the processor further cause the apparatus to sense whether the pedestrian moves along the sidewalk or moves into the dangerous area.

5. The apparatus of claim 1, wherein the program instructions, when executed by the processor further cause the apparatus to:
calculate a moving direction and a velocity vector of the pedestrian based on the second velocity and direction information of the pedestrian;
calculate a moving direction and a velocity vector of the subject vehicle;
calculate an interconnecting point between the velocity vector of the pedestrian and the velocity vector of the subject vehicle; and
calculate a time, in which the subject vehicle arrives at the interconnecting point, as the time to collision (TTC).

6. The apparatus of claim 1, wherein the program instructions, when executed by the processor further cause the apparatus to operate a brake device of the subject vehicle to forcibly decelerate or stop the subject vehicle and request the parking vehicle which is parked or stopped to warn the pedestrian, when the time to collision (TTC) is less than a first threshold value.

7. The apparatus of claim 6, wherein the program instructions, when executed by the processor further cause the apparatus to warn the driver of the subject vehicle such that the driver drives the subject vehicle at a reduced speed, and request the parking vehicle which is parked or stopped to warn the pedestrian, when the time to collision (TTC) is equal to or greater than the first threshold value and is less than a second threshold value.

8. The apparatus of claim 7, wherein the program instructions, when executed by the processor further cause the apparatus to request the parking vehicle which is parked or stopped to warn the pedestrian, when the time to collision (TTC) is equal to or greater than the second threshold value and is less than a third threshold value.

9. The apparatus of claim 8, wherein the program instructions, when executed by the processor further cause the apparatus to:
determine a present situation as an emergency situation to request the parking vehicle which is parked or stopped to warn the pedestrian by simultaneously operating a horn and an emergency lamp, when the time to collision (TTC) is less than the first threshold value; and
request the parking vehicle which is parked or stopped to warn the pedestrian by operating one of the horn and the emergency lamp, when the time to collision (TTC) is equal to or greater than the first threshold value.

* * * * *